July 8, 1947.    J. KAMLET    2,423,599
PROCESS FOR PREPARING ALPHA-METHALLYL ALCOHOL
Filed Nov. 14, 1944
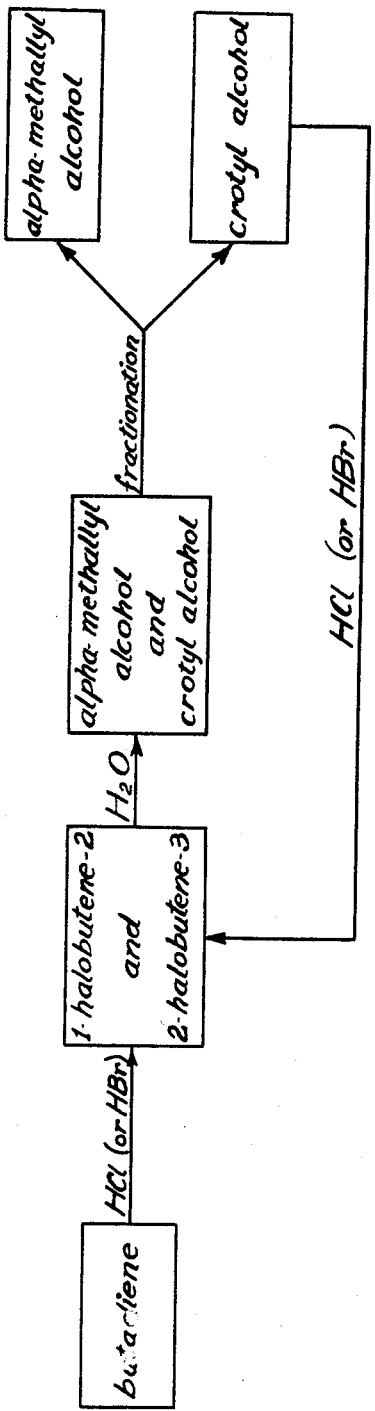
INVENTOR.
JONAS KAMLET
BY Patented July 8, 1947

2,423,599

UNITED STATES PATENT OFFICE 2,423,599

PROCESS FOR PREPARING ALPHA-METHALLYL ALCOHOL

Jonas Kamlet, New York, N. Y., assignor to Publicker Industries Inc., a corporation of Pennsylvania Application November 14, 1944, Serial No. 563,436

12 Claims. (Cl. 260—640)

The present invention relates to alpha-methallyl alcohol and it relates more particularly to a new and improved process for preparing alpha-methallyl alcohol, substantially free of isomers, from inexpensive and readily available industrial intermediates.

An object of the present invention is to provide a new and improved process for preparing alpha-methallyl alcohol. Another object of the present invention is to provide a novel process for preparing alpha-methallyl alcohol, in good yield, from butadiene. A further object of the present invention is to provide a process for preparing alpha-methallyl alcohol, substantially free of isomers, employing butadiene and other relatively inexpensive and commercially available compounds, as raw materials.

While various processes have been proposed, in the past, for the production of alpha-methallyl alcohol (which, as such or in the form of such derivatives as ketones and esters, is important as an intermediate in the manufacture of various resins, plastics and elastomers and is also of value as an intermediate in the preparation of various perfumes, dyestuffs, detergents, textile assistants and other organic compounds), none of these has been entirely acceptable since they require relatively expensive and difficult-to-obtain starting materials and since they give relatively low yields.

Accordingly, the present invention contemplates a new and improved process for producing alpha-methallyl alcohol from butadiene and other inexpensive materials by easily carried out steps, to give relatively good yields of the final product.

The accompanying drawing represents a flowsheet of the process of the present invention.

Generally speaking, the process of the present invention comprehends the treatment of butadiene with hydrogen chloride (or bromide) to obtain a mixture of 1-halobutene-2 and 2-halobutene-3; the hydrolysis of the halobutene mixture to an equilibrium mixture of alpha-methallyl alcohol and crotyl alcohol; the separation of the alpha-methallyl alcohol from the crotyl alcohol by fractionation; the conversion of the crotyl alcohol to a mixture of 1-halobutene-2 and 2-halobutene-3 by treatment of the crotyl alcohol with hydrogen chloride (or bromide); and the re-use in the process of the halobutene mixture obtained by treatment of the crotyl alcohol.

The first stage of the process, namely the treatment of the butadiene with hydrogen chloride (or bromide), must be carried out so as to avoid appreciable polymer formation which is apt to occur and which is undesirable since it results in an irrecoverable loss of butadiene. To avoid this undesirable polymerization, I prefer to pass the butadiene, in gaseous form, slowly into a solution of hydrogen chloride (or bromide) in glacial acetic acid through a diffuser plate. Any butadiene that passes through the solution unreacted may be scrubbed through one or more traps arranged in series and containing solutions of hydrogen halide in glacial acetic acid. The reaction mixtures are kept below 25° C. in temperature to avoid polymer formation.

Although it has been stated (Meisenburg United State Patent 1,725,156) that the interaction of butadiene with hydrogen bromide in glacial acetic acid as outlined above, gives only crotyl bromide (1-brombutene-2), I have found that the reaction mixture contains approximately 45–60% of 1-brombutene-2 and approximately 55–40% of 2-brombutene-3. Where hydrogen chloride is used in place of hydrogen bromide, I have found that the reaction mixture contains approximately 20–30% of 1-chlorbutene-2 and approximately 80–70% of 2-chlorbutene-3.

In both cases, the reaction is carried out in the presence of air and without added anti-oxidants.

In the case of the chlorbutenes, the product may be separated from the acetic acid-hydrogen chloride solution by distillation.

In the case of the brombutenes, the reaction mixture is diluted with water whereupon the brombutene separates out as an insoluble layer which can be removed by decantation.

The hydrogen halide solutions can readily be prepared by absorbing the anhydrous hydrogen halide gas in glacial acetic acid. Alternatively, they can be prepared by distilling a mixture of alkali metal halide, glacial acetic acid and concentrated sulfuric acid.

The relative proportions of the 1-halobutene-2 and the 2-halobutene-3, in the mixture obtained as above, is not critical since, due to the well known allylic rearrangement, each of the isomeric halobutenes, upon hydrolysis, gives rise to a mixture of alpha-methallyl alcohol and crotyl alcohol.

Thus, the hydrolysis of the chlorbutene mixture mentioned above gives rise, upon hydrolysis, to an equilibrium mixture containing 60–70% of alpha-methallyl alcohol and 40–30% of crotyl alcohol. Similarly, the hydrolysis of the brombutene mixture mentioned above gives rise to an equilibrium mixture containing 60–75% of alpha-methallyl alcohol and 40–25% of crotyl alcohol.

While the hydrolysis of the halobutene mixture can be effected in various ways (including treatment with an acid solution containing approximately 0.2% cuprous chloride and approximately 2.8% hydrogen chloride at approximately 80–100° C.), I prefer to effect the hydrolysis of the chlorbutene mixture using an aqueous solution of sodium carbonate. This reaction is carried out in an autoclave with vigorous agitation at approximately 150–200° C. using at least an equimolar amount of 10–15% of sodium carbonate solution. After approximately 6 to 8 hours, the autoclave is cooled and the reaction mixture is removed. A small amount of gas, which may be a mixture of butadiene and carbon dioxide, is evolved while the residue comprises an aqueous solution of the equilibrium mixture of alpha-methallyl alcohol and crotyl alcohol; small amounts of unreacted chlorbutenes being present. The yield of the equilibrium mixture is approximately 80% of theory, based on the chlorbutene consumed.

Because of the higher boiling point range of the brombutene mixture and the greater lability of the bromine atom, the hydrolysis of the brombutene mixture is effected much more readily; the brombutene mixture being hydrolyzed to the equilibrium mixture of alpha-methallyl alcohol and crotyl alcohol by refluxing under atmospheric pressure with slightly more than an equimolar amount of sodium carbonate in 10–15% solution for approximately 4 to 5 hours.

The equilibrium mixture of alpha-methallyl alcohol and crotyl alcohol obtained as set forth above, which is soluble in water, is removed from the aqueous solution by exhaustive extraction with a convenient solvent, such as benzene, diethyl ether, di-isopropyl ether, di-methallyl ether, etc.; the combined extracts being then fractionated and the solvent recovered for re-use. Since alpha-methallyl alcohol boils at 97–98° C. while crotyl alcohol boils at 119–120° C. under atmospheric pressure, an effective separation can be accomplished by fractionation.

The alpha-methallyl alcohol fraction comprising 60–75% of the equilibrium mixture is recovered and used as desired.

The crotyl alcohol fraction can also be recovered and used as such if desired. However, since crotyl alcohol is less desirable commercially than alpha-methallyl alcohol, I prefer to re-use it in the process as set forth hereinbelow.

When crotyl alcohol is dissolved in an aqueous solution of hydrogen chloride (or bromide) and the mixture is allowed to stand for from 1 to 6 hours at room temperature, a mixture of halobutenes will separate out as an insoluble layer of mixed halobutenes. In the case of the chlorbutenes, it has been found, by refractive index determinations, that the mixture contains approximately 80–85% of 1-chlorbutene-2 and approximately 20–15% of 2-chlorbutene-3. In the case of the brombutenes, the reaction mixture has been found to contain approximately 75–80% of 1-brombutene-2 and approximately 25–20% of 2-brombutene-3.

I have found, further, that this conversion of the crotyl alcohol to the halobutene mixture can be effected, as well, in a solution of hydrogen halide in glacial acetic acid.

Accordingly, I prefer to combine the crotyl alcohol conversion step with the butadiene-hydrogen halide interaction as set forth hereinbelow.

Butadiene is passed through a glacial acetic acid solution containing 1.5 moles of hydrogen bromide until 1.0 mole of the diolefin has been absorbed. To the reaction mixture is then added 0.5 mole of crotyl alcohol fraction obtained from a previous run. After standing for approximately 6 hours, the reaction mixture is diluted with 2 to 3 volumes of water and the insoluble brombutene layer is recovered as described hereinabove. Of this brombutene mixture, part will have been derived from the butadiene and the remainder will have been derived from the crotyl alcohol as described above.

The following table gives a summary of the relative proportions of isomers obtained:

|  | 2-halobutene-3 | 1-halobutene-2 | Alpha-methallyl alcohol | Crotyl alcohol |
|---|---|---|---|---|
|  | Per cent | Per cent | Per cent | Per cent |
| Butadiene+CH₃COOH—HCl | 70–80 | 30–20 |  |  |
| Butadiene+CH₃COOH—HBr | 40–55 | 60–45 |  |  |
| Chlorbutene hydrolysis |  |  | 60–70 | 40–30 |
| Brombutene hydrolysis |  |  | 60–75 | 40–25 |
| Crotyl alcohol+HCl | 15–20 | 85–80 |  |  |
| Crotyl alcohol+HBr | 20–25 | 75–80 |  |  |

The halobutene mixtures obtained directly from the butadiene and those obtained from the crotyl alcohol, although containing different ratios of isomers, will yield, on hydrolysis, the same equilibrium mixture of approximately 60–75% of alpha-methallyl alcohol and approximately 40–25% of crotyl alcohol.

It follows, therefore, that these halobutene mixtures may be combined prior to hydrolysis instead of being hydrolyzed individually. This saving in operational steps required may be further increased by adding the crotyl alcohol fraction to a halobutene mixture derived from butadiene and containing excess hydrogen halide. That is, instead of first hydrohalogenating the crotyl alcohol fraction to a halobutene mixture and then adding the halobutene mixture to the mixture obtained directly from the butadiene preliminary to hydrolysis as described above, it is possible to add the crotyl alcohol fraction directly to the halobutene mixture derived from the butadiene, in which case the excess hydrogen halide first converts the crotyl alcohol to the halobutene mixture, after which the halobutene mixture can be hydrolyzed as previously described.

Due primarily to mechanical losses, the yield of alpha-methallyl alcohol from the equilibrium mixture is approximately 85% of theory. The over-all yield of alpha-methallyl alcohol from butadiene is, according to my experiments, approximately 61%, although, by increasing the yield during the hydrolysis step, and by reducing mechanical losses in the subsequent steps, the yield may be considerably increased.

The following are illustrative, but not restrictive, examples of the process of the present invention:

*Example 1*

Butadiene gas is passed slowly through an

Aloxite diffuser plate into approximately 150 parts of a 37% solution of hydrogen chloride (1.5 moles) in glacial acetic acid at room temperature until approximately 54 parts of butadiene (1.0 mole) have been absorbed. The temperature of the reaction mixture is kept below 25° C. This addition usually requires from 3 to 4 hours although it may be considerably accelerated by more efficient diffusion of the butadiene gas.

The reaction mixture is then distilled and the fraction coming over between 60° and 90° C. (which comprises the mixture of 1-chlorbutene-2 and 2-chlorbutene-3) is collected. The residual acetic acid may be cooled, brought up to 37% in hydrogen chloride content by absorbing anhydrous HCl gas therein, and returned to the process.

Approximately 91 parts of the chlorbutene mixture (1.0 mole), of which part may have been derived from crotyl alcohol, is added to approximately 1000 parts of a 12% aqueous solution of sodium carbonate (1.13 moles) and the mixture is placed in an autoclave and heated, with vigorous agitation, at approximately 150-160° C., for approximately 8 hours.

The reaction mixture is then allowed to cool to room temperature, a small amount of unreacted chlorbutenes is removed by decantation, and the aqueous solution is repeatedly extracted with successive portions of benzene.

The combined benzene extracts are then fractionated. The fraction coming over up to 90° C. is the solvent, which is returned to the process. The fraction coming over between 90° and 110° C. is the desired alpha-methallyl alcohol. The fraction coming over between 110° and 125° C. is the crotyl alcohol.

Approximately 72 parts of the crotyl alcohol fraction (1.0 mole) is added to approximately 200 parts of a 37% aqueous HCl solution (2.0 moles); the clear solution soon becoming turbid. After the mixture has stood for approximately 6 hours at room temperature, the insoluble layer of chlorbutenes which is separated out is recovered by decantation. This chlorbutene mixture is added to the chlorbutene mixture obtained directly from butadiene and the combined mixtures are treated as hereinabove described.

The residual aqueous solution may be brought up to 37% in HCl concentration by absorbing gaseous hydrogen chloride therein, whereupon it can be returned to the process.

*Example 2*

Butadiene gas is passed slowly through an Aloxite diffuser plate into approximately 300 parts of a 41% solution of hydrogen bromide (1.5 moles) in glacial acetic acid at room temperature, until approximately 54 parts of butadiene (1.0 mole) have been absorbed; the temperature of the reaction mixture being kept below 25° C. The addition usually requires 3 to 4 hours.

Approximately 36 parts of the crotyl alcohol fraction (0.5 mole) from a previous batch are now added and the reaction mixture is allowed to stand at room temperature for approximately 6 hours. Approximately 1200 parts of water are then added and the insoluble mixture of isomeric brombutenes which separates out is recovered by decantation.

Approximately 135 parts of the brombutene mixture (1.0 mole) is added to approximately 1100 parts of a 10% aqueous solution of sodium carbonate (1.04 moles) and the mixture is boiled under reflux at atmospheric pressure for approximately 3 to 4 hours. The reaction mixture is then cooled, a small quantity of unreacted brombutenes is recovered by decantation, and the aqueous residue is repeatedly extracted with successive portions of di-ethyl ether.

The combined ether extracts are then fractionated, the fraction coming over up to 50° C. being the solvent, which is recovered for re-use in the process. The desired alpha-methallyl alcohol is contained in the next fraction coming over up to 110° C. while the fraction coming over between 110° and 125° C. is the crotyl alcohol which is collected and returned to the process, as previously described.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A process for the production of alpha-methallyl alcohol which comprises reacting butadiene with a member of the group consisting of hydrogen chloride and hydrogen bromide thereby to form an equilibrium mixture of 1-halobutene-2 and 2-halobutene-3, hydrolyzing said halobutene mixture to form an equilibrium mixture of alpha-methallyl alcohol and crotyl alcohol, fractionating said alcohol mixture to recover alpha-methallyl alcohol therefrom, reacting the crotyl alcohol with a member of the group consisting of hydrogen chloride and hydrogen bromide to form an equilibrium mixture of 1-halobutene-2 and 2-halobutene-3, and returning the last-mentioned halobutene mixture to the process for conversion to said alcohol mixture.

2. A process for the production of alpha-methallyl alcohol which comprises reacting butadiene with an excess of a member of the group consisting of hydrogen chloride and hydrogen bromide thereby to form an equilibrium mixture of 1-halobutene-2 and 2-halobutene-3, hydrolyzing said halobutene mixture to form an equilibrium mixture of alpha-methallyl alcohol and crotyl alcohol, fractionating said alcohol mixture to recover alpha-methallyl alcohol therefrom, and returning the crotyl alcohol to the process by adding it to said halobutene mixture, for conversion to an equilibrium mixture of halobutenes and thereafter to an equilibrium mixture of said alcohols.

3. A process for the production of alpha-methallyl alcohol which comprises reacting butadiene with hydrogen chloride thereby to form an equilibrium mixture of 1-chlorbutene-2 and 2-chlorbutene-3, hydrolyzing said chlorbutene mixture to form an equilibrium mixture of alpha-methallyl alcohol and crotyl alcohol, fractionating said alcohol mixture to recover alpha-methallyl alcohol therefrom, reacting the crotyl alcohol with hydrogen chloride to form an equilibrium mixture of 1-chlorbutene-2 and 2-chlorbutene-3, and returning the last-mentioned chlorbutene mixture to the process for conversion to said alcohol mixture.

4. A process for the production of alpha-methallyl alcohol which comprises reacting butadiene with an excess of hydrogen chloride thereby to form an equilibrium mixture of 1-chlorbutene-2 and 2-chlorbutene-3, hydrolyzing said chlorbutene mixture to form an equilibrium mixture of alpha-methallyl alcohol and crotyl alcohol, fractionating said alcohol mixture to recover alpha-methallyl alcohol therefrom, and returning the crotyl alcohol to the process by adding it to said chlorbutene mixture for conversion to an equilibrium mixture of chlorbutenes and thereafter to an equilibrium mixture of said alcohols.

5. A process for the production of alpha-methallyl alcohol which comprises reacting butadiene with hydrogen bromide thereby to form an equilibrium mixture of 1-brombutene-2 and 2-brombutene-3, hydrolyzing said brombutene mixture to form an equilibrium mixture of alpha-methallyl alcohol and crotyl alcohol, fractionating said alcohol mixture to recover alpha-methallyl alcohol therefrom, reacting the crotyl alcohol with hydrogen bromide to form an equilibrium mixture of 1-brombutene-2 and 2-brombutene-3, and returning the last-mentioned brombutene mixture to the process for conversion to said alcohol mixture.

6. A process for the production of alpha-methallyl alcohol which comprises reacting butadiene with an excess of hydrogen bromide thereby to form an equilibrium mixture of 1-brombutene-2 and 2-brombutene-3, hydrolyzing said brombutene mixture to form an equilibrium mixture of alpha-methallyl alcohol and crotyl alcohol, fractionating said alcohol mixture to recover alpha-methallyl alcohol therefrom, and returning the crotyl alcohol to the process by adding it to said chlorbutene mixture for conversion to an equilibrium mixture of chlorbutenes and thereafter to an equilibrium mixture of said alcohols.

7. A process for the production of alpha-methallyl alcohol which comprises reacting butadiene with a member of the group consisting of hydrogen chloride and hydrogen bromide in glacial acetic acid solution thereby to form an equilibrium mixture of 1-halobutene-2 and 2-halobutene-3, hydrolyzing said halobutene mixture to form an equilibrium mixture of alpha-methallyl alcohol and crotyl alcohol wherein the alpha-methallyl alcohol preponderates, fractionating said alcohol mixture to recover alpha-methallyl alcohol therefrom, reacting the crotyl alcohol with a member of the group consisting of hydrogen chloride and hydrogen bromide in glacial acetic acid solution to form an equilibrium mixture of 1-halobutene-2 and 2-halobutene-3, and returning the last-mentioned halobutene mixture to the process for conversion to said alcohol mixture.

8. A process for the production of alpha-methallyl alcohol which comprises reacting butadiene with an excess of a member of the group consisting of hydrogen chloride and hydrogen bromide in glacial acetic acid solution thereby to form an equilibrium mixture of 1-halobutene-2 and 2-halobutene-3, hydrolyzing said halobutene mixture to form an equilibrium mixture of alpha-methallyl alcohol and crotyl alcohol wherein the alpha-methallyl alcohol preponderates, fractionating said alcohol mixture to recover alpha-methallyl alcohol therefrom, and returning the crotyl alcohol to the process by adding it to said halobutene mixture for conversion to an equilibrium mixture of halobutenes and thereafter to an equilibrium mixture of said alcohols.

9. A process for the production of alpha-methallyl alcohol which comprises reacting butadiene with hydrogen chloride in glacial acetic acid solution thereby to form an equilibrium mixture of 1-chlorbutene-2 and 2-chlorbutene-3, hydrolyzing said chlorbutene mixture to form an equilibrium mixture of alpha-methallyl alcohol and crotyl alcohol wherein the alpha-methallyl alcohol preponderates, fractionating said alcohol mixture to recover alpha-methallyl alcohol therefrom, reacting the crotyl alcohol with hydrogen chloride in glacial acetic acid solution to form an equilibrium mixture of 1-chlorbutene-2 and 2-chlorbutene-3, and returning the last-mentioned chlorbutene mixture to the process for conversion to said alcohol mixture.

10. A process for the production of alpha-methallyl alcohol which comprises reacting butadiene with an excess of hydrogen chloride in glacial acetic acid solution thereby to form an equilibrium mixture of 1-chlorbutene-2 and 2-chlorbutene-3, hydrolyzing said chlorbutene mixture to form an equilibrium mixture of alpha-methallyl alcohol and crotyl alcohol wherein the alpha-methallyl alcohol preponderates, fractionating said alcohol mixture to recover alpha-methallyl alcohol therefrom, anad returning the crotyl alcohol to the process by adding it to said chlorbutene mixture for conversion to an equilibrium mixture of chlorbutenes and thereafter to an equilibrium mixture of said alcohols.

11. A process for the production of alpha-methallyl alcohol which comprises reacting butadiene with hydrogen bromide in glacial acetic acid solution thereby to form an equilibrium mixture of 1-brombutene-2 and 2-brombutene-3, hydrolyzing said brombutene mixture to form an equilibrium mixture of alpha-methallyl alcohol and crotyl alcohol wherein the alpha-methallyl alcohol preponderates, fractionating said alcohol mixture to recover alpha-methallyl alcohol therefrom, reacting the crotyl alcohol with hydrogen bromide in glacial acetic acid solution to form an equilibrium mixture of 1-brombutene-2 and 2-brombutene-3, and returning the last-mentioned brombutene mixture to the process for conversion to said alcohol mixture.

12. A process for the production of alpha-methallyl alcohol which comprises reacting butadiene with an excess of hydrogen bromide in glacial acetic acid solution thereby to form an equilibrium mixture of 1-brombutene-2 and 2-brombutene-3, hydrolyzing said brombutene mixture to form an equilibrium mixture of alpha-methallyl alcohol and crotyl alcohol wherein the alpha-methallyl alcohol preponderates, fractionating said alcohol mixture to recover alpha-methallyl alcohol therefrom, and returning the crotyl alcohol to the process by adding it to said brombutene mixture for conversion to an equilibrium mixture of brombutenes and thereafter to an equilibrium mixture of said alcohols.

JONAS KAMLET.

REFERENCES CITED

The following references are of record in the file of this patent:

UNITED STATES PATENTS

| Number | Name | Date |
| --- | --- | --- |
| 2,242,084 | Nicodemus et al. | May 13, 1941 |
| 2,313,767 | Pollack et al. | Mar. 16, 1943 |
| 2,373,956 | Hearne et al. | Apr. 17, 1945 |

OTHER REFERENCES

Delaby, "Comptes Rendus," vol. 181, pp. 722–4 (1925).